DELAY LINE CIRCUIT FOR PROCESSING A PAL COLOR TELEVISION SIGNAL

Filed March 10, 1967 2 Sheets-Sheet 1

INVENTOR
DONALD S. HOBBS
BY
Frank R. Jifani
AGENT

DELAY LINE CIRCUIT FOR PROCESSING A PAL COLOR TELEVISION SIGNAL

Filed March 10, 1967 2 Sheets-Sheet 2

INVENTOR
DONALD S. HOBBS

BY

[signature]

AGENT 3,499,105
DELAY LINE CIRCUIT FOR PROCESSING A PAL COLOR TELEVISION SIGNAL

Donald Sydney Hobbs, Reigate, Surrey, England, assignor, by mesne assignments, to U.S. Philips Corporation, New York, N.Y., a corporation of Delaware Filed Mar. 10, 1967, Ser. No. 622,269
Claims priority, application Great Britain, Apr. 29, 1966, 18,865/66
Int. Cl. H04n 9/50, H03d 3/06
U.S. Cl. 178—5.4 7 Claims

ABSTRACT OF THE DISCLOSURE

A signal translating circuit has two branches between a common input and output. One of the branches includes a delay line. Variations of attenuation in the delay line, e.g., due to manufacturing tolerances, can be compensated by a single control by feeding the delay branch from the collector and the other branch from the emitter of a transistor amplifier having a variable emitter resistor. The delay line can have two outputs 180° out of phase connected to two output terminals. This arrangement is particularly useful in the modification of PAL color television signals.

This invention relates to signal translating circuit arrangements comprising a common signal input terminal, a common signal output terminal, first and second branches with their outputs both connected to said common output terminal, said first branch having variable attenuation (as defined) whilst the second branch has substantially constant attenuation, the arrangement being such that said input terminal is coupled to the control electrode of an amplifier stage supplying both branches which stage employs a valve or transistor.

There are circumstances in which it is necessary to combine, at a common output terminal, signals fed through first and second circuit branches having their outputs in parallel, one of which branches has variable attenuation and one of which has substantially constant attenuation.

A typical example of this situation arises in connection with colour television receiver circuits of the PAL type employing a delay-line. In such circuits one of the branches contains the delay-line and said line has considerable attenuation. Said attenuation varies, e.g., with ambient conditions and (which is more important) it is liable to differ from sample to sample due to lack of uniformity in manufacture. These variations in attenuation are not matched by any corresponding variations in the second branch, which may be effectively a resistive connection.

Leaving aside, for the moment, this particular example, such differences in attenuation may not matter in some cases but often they are critical as when the two signals arriving at the output terminal are intended to have certain corresponding signal components equal in amplitude and in opposite phase so as to balance out at said output terminal. It is possible to adjust the resistive connection to balance the said variation in delay-line attenuation but this produces a variation in the amplitude of the wanted output signal. In such balancing networks for colour television receivers of the PAL type the originator of the PAL system (W. Bruch) advises against the use of active elements within the balancing network proper on the ground that these tend to introduce further causes of unbalance between the two branches.

Figure 1:
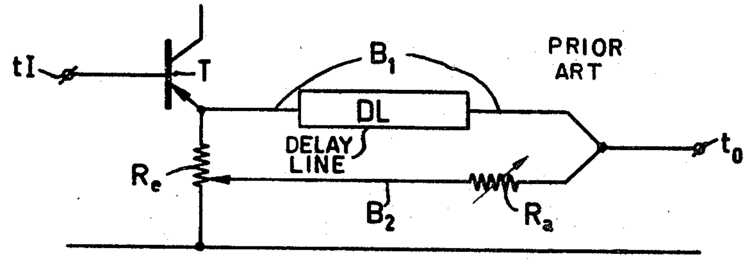

In its application to a circuit for a PAL processing circuit the problem takes the form of adjusting the balance of unwanted components (for example, Q or $B-Y$ chrominance components) to leave wanted components (e.g., I or $R-Y$ chrominance components). Bruch's solution to this particular problem was described in Electronic Engineering (August 1964, pp. 512 et seq.). The proposal made by Bruch involves the use of an active element (e.g., a transistor) outside the balancing circuit in such manner that both branches are fed from the emitter side of the transistor. Such an arrangement is shown in FIG. 1 of the accompanying diagrammatic drawings simplified to the part providing the I signal or $(R-Y)$ signal (Q or $B-Y$ unwanted). As shown a buffer transistor T is connected in emitter-follower configuration with its base coupled to a common input terminal $tI$ supplied with $(I+Q)$ or $\{(R-Y)+(B-Y)\}$ and $(-I+Q)$ or $$\{-(R-Y)+(B-Y)\}$$

signals on alternate lines of the television raster in the manner well known in the PAL system. The emitter of transistor T is connected to an emitter load $R_e$. A first branch $B_1$ comprising a delay-line DL (giving a delay of 1 line period) and a second branch $B_2$ having their outputs connected in parallel to a common output terminal $t_o$. The first branch $(B_1)$ is connected directly between the emitter and terminal $t_o$. The second branch has its input connected to a variable tapping on resistance $R_e$ and said branch includes an isolator resistor $R_a$. When the two branches are in balance for unwanted Q or $B-Y$ signals, then only I or $R-Y$ signals appear at the output terminal $t_o$. If the attenuation of D changes, then the attenuation of branch $B_2$ is adjusted correspondingly by moving the tapping on $R_e$ to restore the balance of the unwanted (e.g., Q or $B-Y$) signal. This, however, causes a change of amplitude in the wanted (e.g., I or $R-Y$) output at $t_o$ so that a further adjustable element must be provided (e.g., by making $R_a$ adjustable as shown) if the amplitude of the I or $R-Y$ signal at $t_o$ is to be restored to the required value. Apart from this inconvenience, it appears to be inappropriate to effect the main adjustment (at $R_e$) on the said of the transistor where the amplification tends to be constant and therefore having to introduce a further adjustment to compensate for the said main adjustment.

Reverting from this special PAL problem to the more general case, it is an object of the invention to provide an improved circuit arrangement which permits the above difficulty to be overcome.

Therefore the arrangement in accordance with the invention is characterized in that the anode of collector load of said valve or transistor is connected to the input of the first branch and a cathode or emitter load thereof being connected to the input of the second branch, and said cathode or emitter load being adjustable to permit compensation for the variations in the attenuation of the first branch.

With the term, "variable" as used above is intended to cover not only elements whose characteristics are liable to change e.g. with ageing or changes in ambient conditions, but also elements which, though individually stable, are liable to vary from specimen to specimen due to lack of uniformity in manufacture. The latter consideration is often the principal one, and it applies frequently to circumstances in which a unit of circuitry is mass-produced and requires the facility of easy adjustment (preferably a single adjustment) to suit the unpredictable characteristics of an element which has to be fitted to the completed circuit. All this is true in cases where the variable element is a delay line, and it is particularly important where the desired operation of the circuit is such that there is a signal in the first branch which must precisely cancel a corresponding signal in the second branch.

In the latter case the first branch may have two outputs to provide two delayed signals mutually displaced by 180° in phase, there being also a second common signal output terminal with both branches having outputs connected to both output terminals. In such an arrangement the two branches may carry a signal which must appear re-inforced at the first output terminal while cancelling out at the second and a further signal which must appear re-inforced at the second terminal while cancelling out at the first. In such cases arrangements according to the invention readily permit the adjustment of the cathode or emitter load to be carried out in such manner as to approach complete or optimum cancellation of the unwanted signal without altering the present amplitude of the wanted signal. Such a cancellation would not be possible if the variation in attenuation in the first branch could not be compensated.

Figure 2:
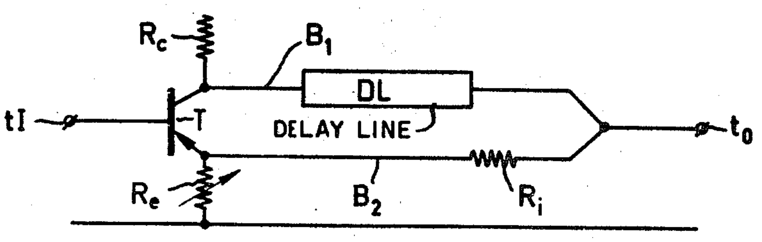
Figure 3:
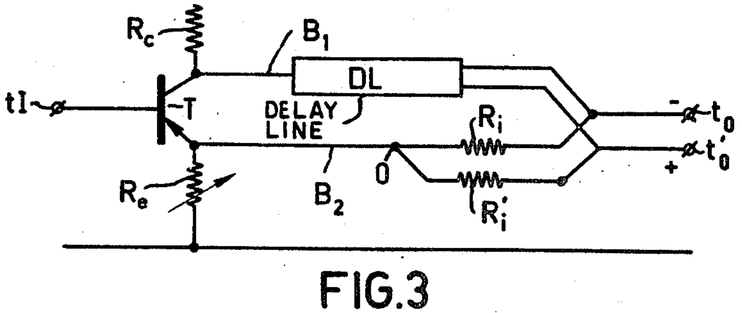
Figure 4:
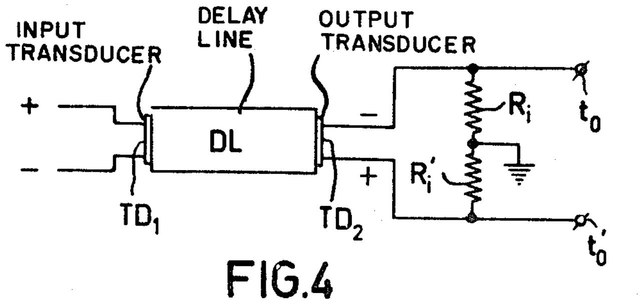
Figure 5:
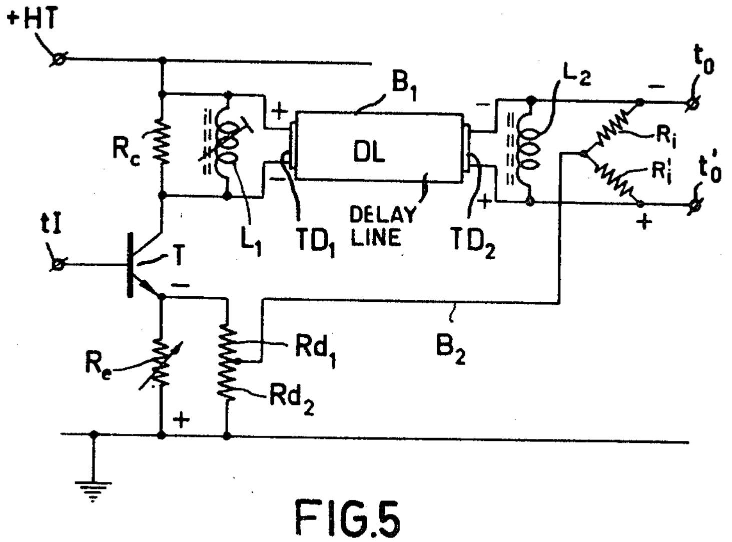
Figure 6:
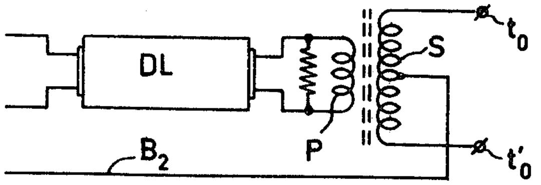

Embodiments of the invention having the above preferred features and properties will now be described by way of example with reference to the accompanying drawings in which FIG. 1 shows the prior art arrangement discussed above, FIG. 2 shows an embodiment in which only one common output terminal is present, FIG. 3 shows an embodiment having two common output terminals, FIG. 4 is used in order to explain the fact that the signals at the two output terminals of the delay line are in antiphase with each other, FIG. 5 shows a more detailed embodiment of the embodiment of FIG. 3, FIG. 6 shows an embodiment which is somewhat different from that of FIG. 5.

Referring now to FIG. 2, the signal translator circuit arrangement shown may form part of a PAL processing circuit and comprises a common signal input terminal $tI$, a common signal output terminal $t_o$, and first and second branches $B_1$ resp. $B_2$ with their outputs both connected to said output terminal $t_o$. The said first branch ($B_1$) has variable attenuation (as defined) mainly due to lack of uniformity in the manufacture of the delay line DL, but also due to ageing thereof. The second branch ($B_2$) has substantially consistant attenuation. The input terminal $tI$ is coupled to the control electrode (in this case the base) of an amplifier stage supplying both branches which stage employs a transistor T with a collector load $R_c$ connected to the input of the first branch $B_1$ and an emitter load $R_e$ connected to the input of the second branch $B_2$. The emitter load $R_e$ is adjustable to permit compensation for the variations in the attenuation of the first branch $B_1$.

For PAL processing purposes the delay line DL of this end succeeding examples may include a small adjustable padding delay unit in series with a main delay unit to permit accurate adjustment of phase (but not of amplitude or attenuation).

The emitter circuit of this arrangement operates as follows. For a given transistor T, the load $R_c$ is arranged to be such that, with the best available delay line DL and load $R_e$ at its maximum value, the output from the delay line DL equals the signal voltage at the emitter. For any delay line DL of lesser quality, the load $R_e$ is produced to restore cancellation of the unwanted signal at the output terminal $t_o$. This effect can be obtained because reduction of the value of $R_e$ reduces the negative feedback of the stage so as to increase the signal voltage at the collector while the signal at the emitter remains substantially constant because the latter is the output of an emitter-follower connection. Therefore only one element has to be adjusted instead of two as in the known arrangement of FIG. 1.

The circuit of FIG. 2 opens the possibility to obtain a simple PAL processing circuit delivering the two separated chrominance signals at one. In such a circuit it is necessary to have an additional output terminal $t_o'$ so that one chrominance signal can cancel at one terminal and appear reinforced at the other and vice versa. Such a circuit is shown in FIG. 3 where the delay line DL has two outputs to provide two delayed signals mutually displaced by 180° in phase, there being also a second common signal output terminal $t_o'$ with both branches having outputs connected to both output terminals. For this purpose the second brance ($B_2$) has an additional isolator resistance $R_i'$ for connection to the terminal $T_o'$.

As known in the art the new-new PAL signal can be written as $$E_1=\alpha(R-Y)\cos\omega t+\beta(B-Y)\sin wt \quad (1)$$

during one line and as $$E_2=-\alpha(R-Y)\cos\omega t+\beta(B-Y)\sin wt \quad (2)$$

during the next line, and so on.

In these signals $\alpha$ and $\beta$ are coefficients determined by the system, $R-Y$ being the red difference and $B-Y$ the blue difference colour signal, whereas $\omega=2\pi f$, $f$ being the frequency of the colour subcarrier.

Now, at the moment signal $E_1$ is delayed over one line period, that means when it is present at the output $t_o$ of delay line DL, signal $E_2$ is present at the input thereof. If said delayed signal is called $E_{1\ to}$ it is always present at the same moment as $E_2$ and it is the same as signal $E_1$. If signal $E_2$ is delayed over one line period in delay line DL and this signal is called $E_{2\ to}$ it is present at the output $t_o$ of delay line DL at the moment signal $E_1$ is present at the input thereof.

However, in the embodiment of FIG. 3 there are always two delayed signals present at the outputs $t_o$ and $t_o'$, which outputs are 180° out of phase with respect to each other. This can be explained with the aid of FIG. 4.

In FIG. 4 there is shown the delay line DL with its input transducer $TD_1$ and output transducer $TD_2$. The input transducer $TD_1$ converts the incoming electrical into acoustical energy. Said acoustical energy travels along the delay line DL and is again converted by output transducer $TD_2$ into electrical energy. Now, delay is to be regarded as a certain number of periods the signal at the output of transducer $TD_2$ is delayed with respect to the signal at the input transducer $TD_1$. A number of periods can also be seen as an even number of phase turns $\pi$ that means $2n\pi$ radius phase turns in which $n$ is a whole number. Now due to the fact that the color subcarrier frequency is a multiple of half the line frequency the number of phase turns of the signal exactly delayed over one line period is equal to $(2n+1)\pi$ radians. That means the signal at the input of transducer $TD_1$ (having a phase as indicated by the +− signs at the two input terminals of $TD_1$) is out of phase with respect to the signal at the output of transducer $TD_2$ (therefore the phase at the output of $TD_2$ can be indicated by the +− signs in FIG. 4). If now the junction of the two resistors $R_I$ and $R_I'$, which have equal resistance values, is grounded the voltage at the output terminal $t_o$ with respect to earth is 180° out of phase with respect to the voltage at output $t_o'$. Or in other words the voltage across resistor $R_i$ is in anti phase with respect to the voltage across resistor $R_I'$.

Turning now to FIG. 5, and neglecting for the moment the voltage divider $R_{d1}$, $R_{d2}$, it will be clear that if the junction of resistors $R_I$ and $R_I'$ is not connected to ground but to the emitter circuit of transistor T, the various phases at imputs and outputs must be compared wih each other. So calling, as before, the input signals $E_1$ and $E_2$, these signals are present across collector load $R_c$ and have +− signs as indicated in FIG. 4. Then the signals across emitter load $R_e$ have the opposite phase due to the behaviour of transistor T. So the signal across emitter load $R_e$ can be written as $-E_1$ and $-E_2$ respectively.

As shown with the aid of FIG. 4 the voltages across resistor $R_I'$ are in phase with the voltages across input transducer $TD_1$. So for these voltages can be written $E_{1\ to}'$ and $E_{2\ to}'$ respectively.

The voltages across resistor $R_I$ are out of phase with respect to the voltages across transducer $TD_1$ so that for those voltages can be written $-E_{1\ to}$ and $-E_{2\ to}$ respectively.

Now it will be evident that the voltages across resistors $R_1$ and $R_1'$ must be added to the voltage across emitter load $R_e$. So the total voltages at the output terminals $t_o$ and $t_o'$ with respect to earth are as follows. During one line the voltage at terminal $t_o$ is $$(-E_1)+(E_{2\ to})=-\alpha(R-Y)\cos\omega t=\beta(B-Y)\sin\omega t+\alpha(R-Y)\cos\omega t-\beta(B-Y)\sin\omega t=-2\beta(B-Y)\cos\omega t \quad (4)$$

During the next line the voltage at terminal $t_o$ is $$(-E_2)+(-E_{1\ to})=+\alpha(R-Y)\cos\omega t-\beta(B-Y)\sin\omega t-\alpha(R-Y)\cos\omega t-\beta(B-Y)\sin\omega t=-2\beta(B-Y)\cos\omega t \quad (4)$$

So it is seen from Formulae 3 and 4 that at thermal $t_o$ the red colour difference signal $(R-Y)$ is balanced out whereas only the blue colour difference signal $(B-Y)$ is present.

Now it can also be shown that during one line the voltage at terminal $t_o'$ is $$(-E_1)+(E_{2\ to})=-\alpha(R-Y)\cos\omega t=\beta(B-Y)\sin\omega t+\alpha(R-Y)\cos\omega t-\beta(B-Y)\sin\omega t=-2\alpha(R-Y)\cos\omega t \quad (5)$$

During the next line there appears a voltage at $t_o'$ of the form $$(-E_2)+(E_{1\ to}')=+\alpha(R-Y)\cos\omega t-\beta(B-Y)\sin\omega t+\alpha(R-Y)\cos\omega t+\beta(B-Y)\cos\omega^t=+2\alpha(R-Y)\cos\omega t \quad (6)$$

So on terminal $t_o'$ only the red colour difference signal $(R-Y)$ remains.

It will be evident that when another PAL signal would be processed, for example, a signal in which I and Q signals are modulated in quadrature on a sub-carrier and the I signal would be switched over 180° from line to line, then the Q signal would be present on terminal $t_o$ and the I signal on terminal $t_o'$.

From the foregoing it will be clear that the amplitudes of $-E_1$; $-E_2$; $E_{1\ to}'$; $E_{2\ to}'$; $-E_{1\ to}$ and $-E_{2\ to}$ must be exactly equal to each other in order that the desired chrominance signals are present and the undesired are balanced out at terminals $t_o$ and $t_o'$ respectively. The several amplitudes can be adjusted with respect to each other in an easy manner with the aid of variable resistor $R_e$.

It will be clear that a change of delay line merely requires a single adjustment of $R_e$ to obtain balance, and such balance will inherently be correct for both output terminals.

In the PAL circuit of FIG. 5 the delay line is shown as a glass line with piezo-electric input and output transducers $TD_1$–$TD_2$ each of which has two terminals. The parasitic capacitance presented at said terminals being tuned out by variable inductances $L_1$ and $L_2$ at the colour subcarrier frequency.

Instead of selecting the value of load $R_c$ for a given transistor so as to provide a "best" delay line output signal equal to the emitter signal, the said output signal may be arranged to be smaller than the emitter signal, and a suitable fraction of the emitter signal voltage can then be taken for application to $R_1$–$R_1'$. For this purpose a potential divider $Rd_1$–$Rd_2$ may be added as shown.

One practical set of values and components for the arrangement of FIG. 5 will now be given by way of illustration:

TABLE

| | |
|---|---|
| Resistor $R_c$ | 150 ohms. |
| Resistor $R_{d1}$–$R_{d2}$ | 47 ohms each. |
| Resistor $R_e$ | Variable from 220 to 320 ohms. |
| Resistor $R_1$–$R_1'$ | 75 ohms each. |
| Transistor T | Mullard type BF115. |
| Delay of unit DL | 63.943 μsec. for a PAL subcarrier of 4.43361875 mc./s. |

With the above values of resistor $R_e$ it is desirable to use a capacitor (of value 0.1 μf.) connected across the 220 ohms fixed part of the resistor.

Therefore it can be seen that a quite simple processing circuit is obtained which directly delivers the separated colour signals at terminals $t_o$ and $t_o'$ without additional adjusting means (such as variable resistor $R_a$ in FIG. 1) and without additional phase inverter means such as a transformer.

The signals present at terminals $t_o$ and $t_o'$ can be forwarded to known synchronous demodulator circuits which deliver the signals $(R-Y)$ and $(B-Y)$ as in the new-new PAL system, or signals I and Q as in the elder PAL system.

It is also possible, as already proposed by Bruch, to add the local generated coluor subcarrier to the input terminal $tI$. That signal is set up of two phases perpendicular to each other in the same way as the two phases of the $(R-Y)$ and $(B-Y)$ or the I and Q signals. Then one of said two phases of said local subcarrier signals, which corresponds with either the $(R-Y)$ or the I phase is switched from line to line before it is applied to the terminal $tI$. If this is done, it can be shown in the same manner as is done for the colour signals only, that each colour signal as present on terminals $t_o$ and $t_o'$ has added to it the local subcarrier signal in the correct phase. Then the signals from terminals $t_o$ and $t_o'$ can directly be applied to normal top-detectors which are cheaper as synchronous demodulators.

FIG. 6 shows a variation of the delay line output part of the circuit of FIG. 5. Here a transformer (having primary P and split secondary S) provides the connections to terminals $t_o$–$t_o'$ and the branch $B_2$. The use of a transformer permits the centre-tap on S to act as an "grounded" point (the ends of S being "live") so that the signal from branch $B_2$ can be aplied to it without the need for the isolator resistors $R_1$–$R_1'$. However, a transformer, which for this purpose usually will comprise a core, is more expensive than two resistors. Moreover, it is just an aim of the present invention to obtain the two colour signals separately without the need of an additional transformer. For the sake of completeness however, the possibility of the use of such a transformer is mentioned.

The advantage of the invention when used in PAL processing circuits can be summarized as follows:

(1) The aforementioned objection of W. Bruch to the use of active elements within the balancing network is overcome. Although an active element is so used (e.g., transistor T in the embodiments described), heavy negative feedback introduced by $R_e$ (or equivalent) results in stabilization of the transistor T (or other active elements) against changes therein due, for example, to changes in temperature or spreads due to lack of uniformity in manufacture.

(2) A single adjustment gives balance in amplitude and at a standard amplitude which will be the same for all delay lines.

(3) Balance adjustment does not affect the terminating resistance values which affect the bandwidth of the system (e.g., the values of $R_c$ and $(R_1+R_1')$ in the case of FIG. 5).

(4) Adjustment in the emitter circuit gives a minimum of spurious phase variations and allows the use of cheaper variable resistors.

What is claimed is:

1. A signal translating circuit of the type comprising a common signal input terminal, first and second circuit output terminals, means for amplifying having input, output and common electrodes, means for coupling said input electrode to said signal input terminal, common and output load means coupled to said common and output electrode electrodes respectively, a first branch circuit including a delay line having a first input and first and second output terminals, said delay line output terminals having output signals of opposite phase, said delay line first input terminal being coupled to said output load means, means for coupling said first and second delay line output terminals to said first and second circuit output terminals respectively, a second branch circuit having substantially constant attenuation and having an input coupled to said common load means and an output, means for adding the output of said second branch circuit to said first and second circuit output terminals, said common load means being variable to permit compensation for variations in the attenuation of said first branch circuit.

2. A circuit as defined in claim 1 wherein said delay line has a second input terminal coupled to said output load means to receive a signal out of phase with respect to the signal in said first input terminal of said delay line.

3. A circuit as defined in claim 2 wherein said means for coupling said delay line output terminals to said circuit output terminals comprises a transformer having a primary winding coupled to said delay line output terminals and a secondary winding coupled to said circuit output terminals.

4. A circuit as defined in claim 3 wherein said adding means comprises a tap on said secondary winding.

5. A circuit as defined in claim 2 further comprising a voltage divider coupled between the input of said second branch and said common load means.

6. A circuit as defined in claim 1 wherein said adding means comprises a resistance branch coupled between said circuit output terminals and having a tap coupled to said output of said second branch.

7. The signal translating circuit of claim 1 for receiving PAL color television signals, comprising a source of said color signals connected to said signal input terminal, and said first branch circuit has a delay of one line period as compared to said second branch circuit.

References Cited

UNITED STATES PATENTS 2,816,267 12/1957 Jager et al. ---------- 332—11

ROBERT L. GRIFFIN, Primary Examiner

J. C. MARTIN, Assistant Examiner

U.S. Cl. X.R.

307—232; 328—133

PO-1050
(5/69)

UNITED STATES PATENT OFFICE
CERTIFICATE OF CORRECTION

Patent No. 3,499,105 Dated March 3, 1970

Inventor(s) DONALD SYDNEY HOBBS

It is certified that error appears in the above-identified patent and that said Letters Patent are hereby corrected as shown below:

col. 2, line 26, change "D" to -- DL --;

col. 3, line 38, cancel "consistant" and insert -- constant --;

col. 4, line 4, cancel "brance" and insert -- branch --;

line 40, change "radius" to -- radians --;

line 60, change "imputs" to -- inputs --;

col. 5, line 6, cancel the line and insert as follows: --

$(-E_1)+(-E_{2\ to}) = -\alpha(R-Y)\cos wt - \beta(B-Y)$ --;

line 8, cancel "(4)" and insert -- (3) --;

line 21, change "$(E_{2\ to})$" to -- $(E_{2\ to}')$ --;

line 22, cancel "+" and insert a minus (-);

after "wt" cancel the minus (-) and insert a plus (+);

Signed and sealed this 17th day of September 1974.

(SEAL)
Attest:

McCOY M. GIBSON JR.
Attesting Officer

C. MARSHALL DANN
Commissioner of Patents